US006350503B1

(12) United States Patent
Cheatham et al.

(10) Patent No.: US 6,350,503 B1
(45) Date of Patent: Feb. 26, 2002

(54) TONER CARTRIDGE SEAL ASSEMBLY

(75) Inventors: Mark D. Cheatham, Westminster; Donald Albert Pennington, Sykesville; Brian Wayne Holz, New Windsor, all of MD (US)

(73) Assignee: Static Control Components, Inc., Sanford, NC (US)

( * ) Notice: Subject to any disclaimer, the term of this patent is extended or adjusted under 35 U.S.C. 154(b) by 0 days.

(21) Appl. No.: 09/506,950

(22) Filed: Feb. 18, 2000

(51) Int. Cl.[7] .......................... G03G 15/06; B32B 7/06

(52) U.S. Cl. ...................... 428/40.1; 428/43; 428/66.4; 428/172; 399/106

(58) Field of Search ........................ 428/40.1, 43, 66.4, 428/172; 399/106

(56) References Cited

U.S. PATENT DOCUMENTS 4,615,608 A 10/1986 Mizutani
4,732,277 A 3/1988 Smith
4,862,210 A 8/1989 Woolley
4,930,684 A 6/1990 Patterson
4,931,838 A 6/1990 Ban et al.
4,981,218 A 1/1991 Ban et al.
5,110,646 A 5/1992 Prestel et al.
5,150,807 A 9/1992 Seyfried et al.
5,296,902 A 3/1994 Michlin
5,523,828 A 6/1996 De Kesel
RE35,529 E 6/1997 Michlin

FOREIGN PATENT DOCUMENTS

GB 2289238 11/1995

*Primary Examiner*—Alexander S. Thomas
(74) *Attorney, Agent, or Firm*—William London

(57) ABSTRACT

A Toner Cartridge Seal Assembly including a gasket, a handle integral with a gasket, and a removable seal lying over the gasket. The handle which is integral with the gasket is in, one embodiment, removable by detaching the handle from the remainder of the gasket along a series of perforations. Alternatively, in another embodiment the handle may be folded over the gasket after the seal assembly is attached to the toner cartridge. The Toner Cartridge Seal Assembly of this invention is used to contain toner in a toner hopper during the transport of a toner cartridge. The removable seal is, in the preferred embodiment, integral with a tail. The tail folds back over the seal and extends outside of the cartridge. Upon arrival at its intended destination the end user pulls the tail removing the removable seal and exposing the toner in the toner hopper to the remainder of the toner cartridge. The invention is usable in both new and rebuilt or remanufactured toner cartridges.

14 Claims, 4 Drawing Sheets

TONER CARTRIDGE SEAL ASSEMBLY

Toner cartridges are used in a variety of xerographic apparatuses including printers, copiers, facsimile machines, and devices which combine these three functions in a single device. A toner cartridge typically consists of a toner hopper ultrasonically welded to a developer roller housing, and removably attached to a waste bin section. During transportation the toner is confined to the toner hopper by a removable seal. Upon the toner cartridges' arrival at its final destination, the end user removes a seal allowing toner to move from the toner hopper to the developer roller.

Seals are used by original equipment manufacturers to seal new toner cartridges, and are also used by remanufacturers of toner cartridges. A remanufacturer takes a used toner cartridge, cleans it, replaces any worn out components, adds new toner, and then sells the resulting product to an end user as a remanufactured cartridge. Such remanufactured cartridges are typically sold at a discount to new cartridges.

The purpose of the seal is to ensure that toner does not migrate from the toner hopper during shipping. Toner is a fine, dry powder. If it is not confined to the toner hopper it will migrate throughout the package and may damage other components of the cartridge. Such toner migration will also create an esthetically unpleasant mess for the end user. If the toner is not confined to the toner hopper the end user will end up with toner on their hands and clothes.

A variety of seals have been used to seal or reseal toner cartridges. Many OEMs use a heat seal of a single strip of clear plastic material over the toner hopper. The OEM, and many remanufacturers after them, have also used a gasket seal assembly similar to that depicted in U.S. Pat. No. 5,223,068. This seal assembly has a gasket of a stiff material such a polystyrene heat-sealed to a removable seal, typically a polyethylene. The gasket is then attached by glue or other adhesive to the toner hopper sealing surface. The end user pulls on the tail of the removable seal exposing the gasket opening and thus allowing toner to migrate from the toner hopper to the developer roller.

While seals assemblies of this kind are common, they offer challenges particularly to the remanufacturer. The stiff plastic gasket does not seal well. Particularly for narrow cartridges it is difficult to place properly.

The seal assembly disclosed in U.S. Pat. No. 5,223,068 is most easily used where the toner hopper has been separated from the developer roller section as disclosed in that patent.

U.S. Pat. No. 5,523,828 discloses, but does not claim, a gasket seal covered with a seal material. The gasket is described as being made of an open cell foam, and the seal is a polyethylene ribbon material. This patent adds an additional layer of stiff material removably attached to the gasket, which acts as a support or handle to facilitate maneuvering the seal assembly into position.

While the maneuverability of this seal is an advantage over the prior gasket seal, the seal is expensive to construct because of the need for the additional layer of material, which is the support. Furthermore, in order to manufacture this seal assembly this support must be placed on the seal assembly by hand rather than as a step in an automated process. In addition, the layer of stiff material must be removed and thrown away before the cartridge may be used, creating disposal issues. The present invention improves on these seal assemblies by making an easy to maneuver, easy to automate seal assembly. The present invention relates to an improved seal assembly for new toner cartridges as well as for remanufactured toner cartridges.

BRIEF DESCRIPTION OF INVENTION

This invention relates to a seal assembly for toner cartridge used in xerographic devices such as printers, copiers, facsimile machines, and all-in-one devices that combine all three functions. The seal assembly is designed to be easily remaneuverable, and capable of being manufactured in an automated process. The seal assembly is further designed for remanufacturers, although original equipment manufacturers may find the device useful. The seal assembly generally comprises a substantially rigid gasket with a rectangular slot in the center of the gasket forming the gasket opening. A removable seal lies over the gasket. The gasket has a handle formed on one side of it. In the preferred embodiment the gasket and handle are made integrally of the same material. The removable seal is made of a material which tears preferentially in a given orientation. In the preferred embodiment the removable seal is integral with a tail. The end user grasps the handle to maneuver the seal assembly over the toner hopper discharge opening. After the seal assembly is installed, the tail of the seal assembly on the toner hopper is laid back over the removable seal and is placed through an opening between the toner hopper and the developer roller housing. The end user pulls the tail. This causes the removable seal to be removed from over the toner hopper discharge opening. In the preferred embodiment the removable seal material tears in the direction in which the tail is being pulled exposing an opening substantially the same size as the toner hopper discharge opening. The gasket may be thought of as having two sides. In the preferred embodiment the removable seal extends across the width of the gasket slot on the first side of the gasket. On the second side of the gasket is a layer of pressure sensitive adhesive. Over the layer of pressure sensitive adhesive on the opposite side of the gasket parallel to the gasket and the pressure sensitive adhesive layer is a removable release liner.

In one embodiment of the invention the handle is perforated to facilitate removal of the handle after the seal is installed and the handle no longer serves a function. In an alternate embodiment the handle has a layer of adhesive on its surface to allow the handle to be attached to the edge of the seal assembly after the seal assembly is installed by folding the handle over and pressing the handle down, attaching the handle out of the way after it has been used. The handle is sized so as to allow it to be laid over the cover, but not block the area of the cover which is removed when the tail of the seal is pulled.

DETAILED DESCRIPTION

Figure 1:
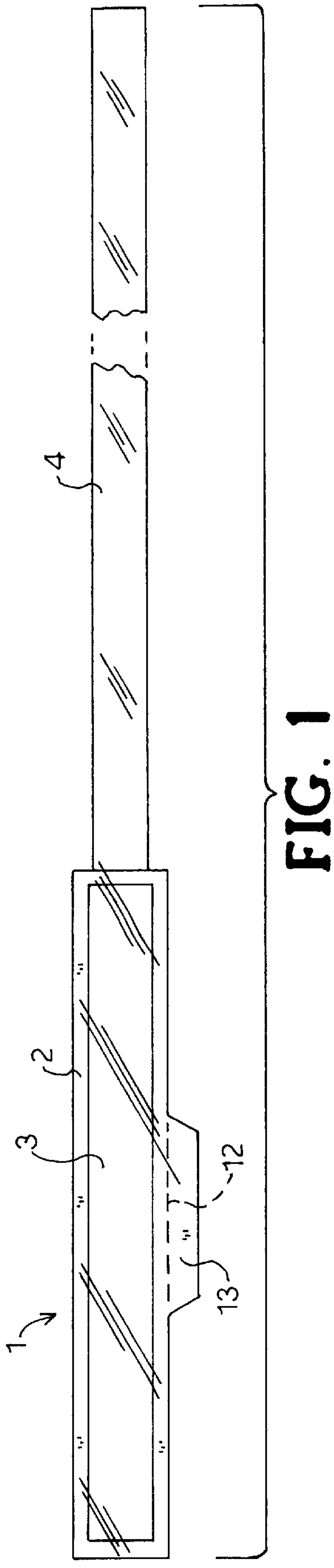
FIG. 1 is a plan view of the seal assembly of this invention.

FIG. 1 shows a plan view of the seal assembly 1 of this invention.

Figure 2:
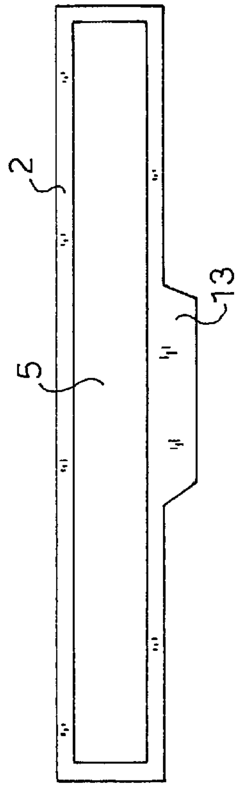
FIG. 2 is a plan view of the gasket portion of the seal assembly of this invention.

FIG. 2 shows the gasket 2 of the seal assembly. The gasket 2 has a gasket opening 5 running down its lengths.

This gasket opening 5 is sized to be roughly the same size and shape as the toner hopper discharge opening 10. The gasket 2 is substantially rigid to facilitate maneuvering the seal assembly 1 into place using the handle 13. The gasket 2 may be made of a rigid plastic such as polystyrene, or a semi rigid foam, preferably a closed cell foam. The gasket opening 5 is covered by the removable seal 3, which is in turn attached to the tail 4. The removable seal 3 is made of a material such as polypropylene which tears preferentially in a given direction. This ability to tear preferentially may be further increased by embossing the material. The removable seal 3 may be integral with the tail 4, or the tail 4 may be a separate material attached to the removable seal 3. As illustrated in FIG. 1, the tail 4 is integral with the removable seal 3. The removable seal 3 covers the gasket opening 5.

The gasket 2 has a handle 13 attached to it. The handle may be a separate material attached to the gasket 2, but in the preferred embodiment it is made of the same material integral with the gasket. The end user may grasp the handle 13 and move the seal. The seal handle 13 and gasket 2 are sufficiently stiff, that if the handle is twisted, the seal assembly will twist with it. This stiffness allows the end user to maneuver the seal assembly 1 with a single hand. In the preferred embodiment the handle 13 is integral with the gasket 2 and made of the same material. The handle may have perforations 12 dividing it from the gasket 2. The perforations 12 allows the handle 13 to be torn off or removed from the gasket 2 after the seal assembly 1 is placed in position.

Figure 6:
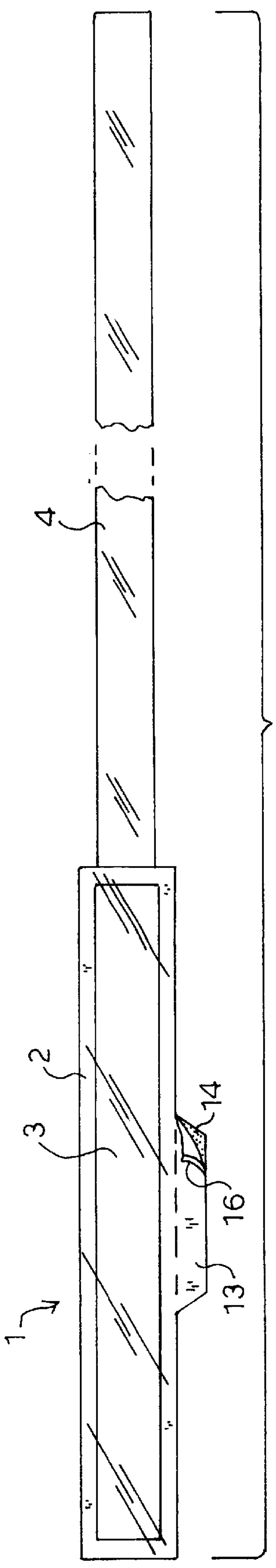
FIG. 6 is a plan view of another embodiment of this invention.

An alternate arrangement is depicted in FIG. 6. FIG. 6 also shows a plan view of a seal assembly 1. In this embodiment the handle 13 has an adhesive layer 14 over the handle 13. This adhesive layer 14 is preferably covered by a release liner 16. After the handle 13 is used to place the seal assembly 1 in position the adhesive layer 14 is exposed by removing the release liner 16. The handle 13 may then be folded over the seal assembly 1 and adhered to the seal assembly 1. The handle 13 is sized so as to not cover the gasket opening 5 after it is folded on top of the seal assembly 1 and adhered to it. Although a single handle 13 is shown in the drawings more than one handle 13 may be used.

Figure 3:
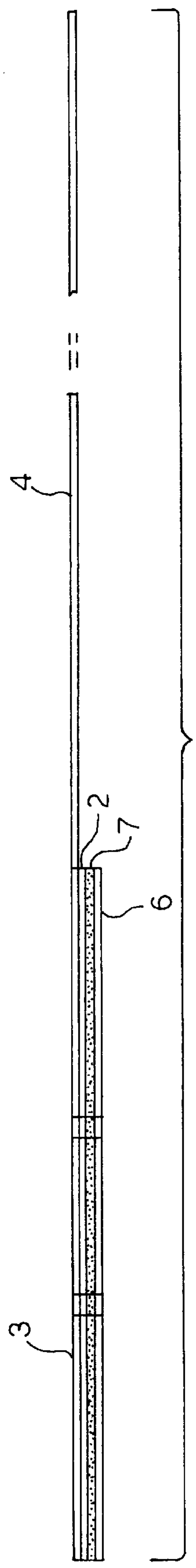
FIG. 3 is a cross section view of one embodiment of the seal assembly of this invention.

FIG. 3 shows the seal assembly 1 in cross section. The removable seal 3 is on top in this depiction. The gasket 2 is attached to the removable seal 3, either by a heat seal or other adhesive layer not shown. While the first side of the gasket 2 is attached to the removable seal, the second side of the gasket 2 is attached to an adhesive layer 7. The adhesive layer 7 is then attached to a release liner 6. An operator in use would remove the release liner 6, exposing the adhesive 7. The operator would then grab the handle 13 and maneuver the seal assembly 1 into position over the toner hopper discharge opening 10. The seal is then placed in contact with the toner hopper sealing surface 9. The adhesive layer 7 then securely attached the gasket to the toner hopper sealing surface 9.

Figure 4:
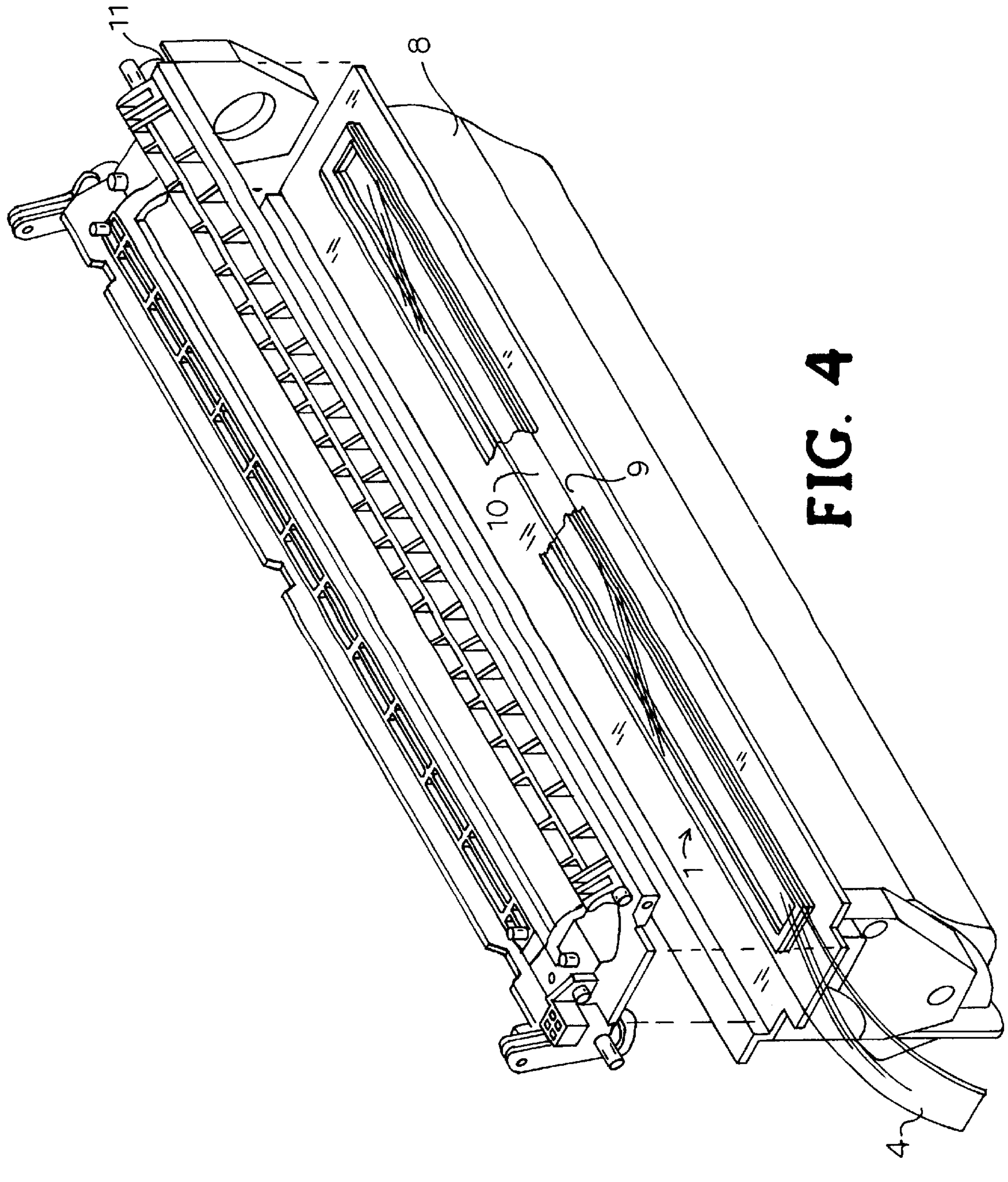
FIG. 4 is an exploded view of one embodiment of the seal assembly of this invention.
Figure 5:
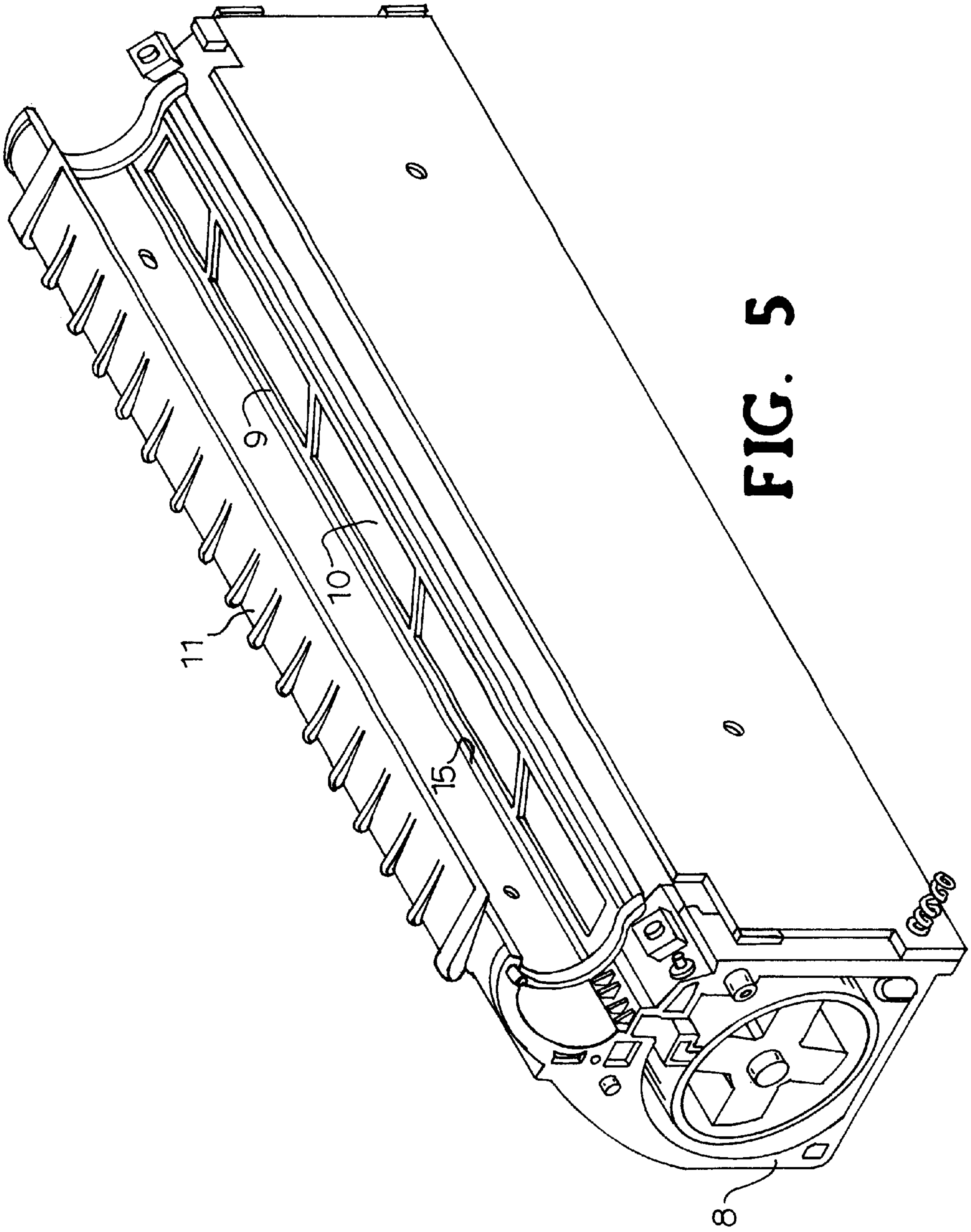
FIG. 5 is an exploded view of a toner hopper and developer roller housing after separation.

FIG. 4 shows a toner hopper 8 and a developer roller housing 11 that have been separated from one another. This separation clearly exposes the toner hopper sealing surface 9 and makes installation of a seal assembly 1 relatively easy. FIG. 5, by contrast, shows a developer roller housing 11 attached to a toner hopper 8. In cartridges of the type depicted in FIG. 5, the toner hopper sealing surface 9 is relatively small and not well exposed. In addition, the slotted section 15 of the toner hopper sealing surface 9 is a narrow gap between the developer roller housing 11 and the toner hopper 8. The seal assembly 1 must be inserted into this slotted section 15. Seals of the type of this invention are particularly useful in this configuration of cartridge because the handle 13 gasket 2 substantially allow the seal assembly to be maneuvered into the slotted section 15 insuring a good seal.

The gasket 2 should be made of a substantially rigid material. This may be a plastic, or cardboard. In the preferred embodiment the removable seal 3 and the tail 4 are made of the same material, and are integral with one another. The preferred material is polyethylene ribbon material with a strand-oriented direction to ensure that the removable seal will tear. Another preferred material is a strand-oriented polyethylene with embossing parallel to the direction of the tear. The tail 4 is approximately the width of the gasket opening 5. By pulling on the tail the end user is able to expose the full gasket opening 5. The removable seal 3 tears in the preferred embodiment, creating an opening approximately the size of the gasket opening 5. The removable seal 3 would also pull entirely away from the gasket 2.

The removable seal 3 is depicted in FIG. 1 and FIG. 6 as being narrower than the gasket 2. Although this certainly may be done, in the preferred embodiment the removable seal 3 extends to the edge of the gasket 2 and indeed over the handle 13. The reason for this construction of the seal assembly 1 is that the layers depicted in FIG. 3 may be laminated in an automatic process. The laminated areas may then cut in one single subsequent process. Thus, in this process the removable seal 3 covers the full width of the gasket 2, including the handle 13. The area of the removable seal 3 that lies on the handle 13 may be kiss cut by allowing for an automated process. The seal may be made inexpensively with fewer components. The adhesive layer 7 is preferably is a pressure sensitive adhesive, although other adhesives may be used to fit the configurations of a manufacturers process. Although this seal is principally used for remanufactured cartridges, they are used by original equipment manufacturers as well.

Although the invention has been described with reference to the drawings and specification above, other embodiments may be readily appreciated by those skilled in the art, and are within the spirit and scope of this invention. The description set forth above should not be read as a limitation on the scope of this invention.

We claim:

1. A seal assembly for use in a toner cartridge comprising: a stiff gasket having a first side and a second side, a gasket opening in the center of the gasket, and a stiff handle attached directly to the gasket wherein any movement of the handle will cause a corresponding movement of the seal assembly, a removable seal attached to the first side of the gasket covering the gasket opening, and a flexible tail attached to the removable seal.

2. A seal assembly as in claim 1 wherein said handle is removably attached to said gasket.

3. A seal as in claim 2 wherein the gasket and handle are separated by perforations.

4. A seal assembly as in claim 1 further comprising an adhesive layer attached to the second side of the gasket.

5. A seal assembly as in claim 4 further comprising a release liner attached to the adhesive layer.

6. A seal assembly as in claim 1 wherein the handle has a first side oriented in approximately the same plane as the first side of the gasket, and the handle has a second side oriented in approximately the same plane as the second side of the gasket, further comprising an adhesive layer attached to the first side of the handle.

7. A seal assembly as in claim 6 further comprising a release liner on the adhesive layer attached the first side of the handle.

8. A seal as in claim 1 wherein the removable seal is comprised of a material that preferentially tears in a given direction.

9. A seal assembly as in claim 8 wherein the material is a strand oriented polyethylene.

10. A seal assembly as in claim 9 wherein the strand oriented polyethylene is embossed in a direction parallel to the preferred tear direction.

11. A seal assembly as in claim 10 wherein the flexible tail has a width approximately equal to the width of the gasket opening and wherein the removable seal has a width that is broader than the width of the tail.

12. A seal assembly as in claim 1 wherein the gasket and handle are formed of a single material.

13. A seal as in claim 1 wherein the material forming the gasket and handle is a foam.

14. A seal as in claim 1 further comprising additional handles.

* * * * *